(12) United States Patent
Huang

(10) Patent No.: US 8,678,614 B2
(45) Date of Patent: Mar. 25, 2014

(54) LIGHT SOURCE SYSTEM

(75) Inventor: Junejei Huang, Taoyuan-Hsien (TW)

(73) Assignee: Delta Electronics, Inc. (TW)

( * ) Notice: Subject to any disclaimer, the term of this patent is extended or adjusted under 35 U.S.C. 154(b) by 79 days.

(21) Appl. No.: 13/586,036

(22) Filed: Aug. 15, 2012

(65) Prior Publication Data

US 2013/0208464 A1 Aug. 15, 2013

Related U.S. Application Data

(60) Provisional application No. 61/596,832, filed on Feb. 9, 2012.

(30) Foreign Application Priority Data

Apr. 25, 2012 (TW) .............................. 101114613 A

(51) Int. Cl.
- *F21V 9/16* (2006.01)
- *F21V 13/14* (2006.01)
- *F21V 14/08* (2006.01)

(52) U.S. Cl.
USPC ............. 362/231; 362/84; 362/232; 362/235; 362/259; 362/293; 362/282; 362/323

(58) Field of Classification Search
USPC ........... 362/84, 230, 231, 232, 235–237, 293, 362/281–284, 322–324, 259; 353/7, 94
See application file for complete search history.

(56) References Cited

U.S. PATENT DOCUMENTS

| | | | |
|---|---|---|---|
| 6,334,685 B1 | 1/2002 | Slobodin | |
| 6,758,579 B2 * | 7/2004 | Ishikawa et al. | 362/238 |
| 6,812,979 B2 | 11/2004 | Um | |
| 8,142,050 B2 * | 3/2012 | Emtman et al. | 362/231 |
| 8,491,133 B2 * | 7/2013 | Yamagishi | 353/94 |
| 2008/0151193 A1 | 6/2008 | Reder | |
| 2010/0007852 A1 | 1/2010 | Bietry et al. | |
| 2012/0201030 A1 * | 8/2012 | Yuan et al. | 362/293 |
| 2013/0314670 A1 * | 11/2013 | Huang | 353/7 |

FOREIGN PATENT DOCUMENTS

| | | |
|---|---|---|
| CN | 201107537 Y | 8/2008 |
| CN | 101995760 A | 3/2011 |

* cited by examiner

*Primary Examiner* — Alan Cariaso
(74) *Attorney, Agent, or Firm* — Cantor Colburn LLP

(57) ABSTRACT

A light source system includes two solid-state light sources, two filters, a rotary wheel, a first reflector, a second reflector and a multiband filter is provided. The rotary wheel has a first surface and a second surface opposite to the first surface. The two solid-state light sources and the two filters are disposed in front of the first surface. The first surface includes a first waveband converting region, a reflecting region and a transmission region. The second surface includes a second waveband converting region is symmetrical to the first waveband converting region. The first reflector, the second reflector and the multiband filter are disposed in front of the second surface. Furthermore, the multiband filter is disposed between and optically coupled with the first and the second reflectors. With these arrangements, the light source system could provide light beams of different wavebands to the light valve of a projector.

19 Claims, 7 Drawing Sheets

LIGHT SOURCE SYSTEM

CROSS-REFERENCES TO RELATED APPLICATIONS

This application claims priority to U.S. provisional application No. 61/596,832 filed on Feb. 9, 2012, and Taiwan Patent Application No. 101114613 filed on Apr. 25, 2012, which are hereby incorporated herein by reference in their entirety.

BACKGROUND OF THE INVENTION

1. Field of the Invention

The present invention provides a light source system, and more particularly, to a light source system for use in a projector.

2. Descriptions of the Related Art

Due to the rapid development of solid-state light sources and related technologies, solid-state light sources have a longer service life, higher efficiency and capability of rapid switching as compared to conventional light sources. Therefore, solid-state light sources have gradually replaced conventional light sources and have been applied to most three-dimensional (3D) projection apparatuses in the market.

Generally, a prototype of 3D projection apparatus that uses solid-state light sources to project light beams of multiple wavebands includes two blue lasers of different wavelengths and two color wheel modules. The blue lasers each provide a light beam. With different timings in operation of the projection apparatus, the light beams are propagated into or are transmitted through a phosphor rotary wheel where they are either converted into a red or green light, or just remain as blue wavebands. Then, the red, green or blue lights propagate into a color wheel with a narrow waveband, and depending on the color filtering regions through which the colored lights pass respectively, the colored lights are divided into left-eye viewing lights and right-eye viewing lights respectively. Even with a simple light path arrangement, the projection apparatus must have the phosphor rotary wheel and the color wheels must operate synchronously, thereby, requiring the use of a relatively complex structure to align and manipulate the light paths precisely. Therefore, this projection apparatus has a relatively high cost and is difficult to be miniaturized, which is cost ineffective and in contradiction to the development trend in the art.

Accordingly, it is important to design a light source system with a simplified optical structure, a miniaturized volume, or improved brightness that can be applied to 3D projection or two-dimensional (2D) projection.

SUMMARY OF THE INVENTION

An objective of the present invention is to provide a light source system with a simplified optical structure. Another objective of the present invention is to provide a light source system with a miniaturized volume. A further objective of the present invention is to provide a light source system that is applicable to 3D projection. Yet a further objective of the present invention is to provide a light source system that is applicable to 2D projection and that has a desirable color gamut.

To achieve the aforesaid objectives, the present invention provides a light source system, which comprises two solid-state light sources, two filters, a rotary wheel, a first reflector, a second reflector and a multiband filter. The rotary wheel has a first surface and a second surface opposite to the first surface. The two solid-state light sources and the two filters are disposed in front of the first surface of the rotary wheel. The first reflector, the second reflector and the multiband filter are disposed in front of the second surface of the rotary wheel. The multiband filter is disposed between the first and the second reflectors, and is optically coupled with the first and the second reflectors.

The two solid-state light sources are disposed adjacent to each other, and respectively used to provide a first light beam of a first waveband and a second light beam of a second waveband. The two filters are disposed in front of the two solid-state light sources respectively, and respectively match with the first waveband and the second waveband. The first surface of the rotary wheel further comprises a first waveband converting region, a reflecting region and a transmission region. In detail, the first waveband converting region and the reflecting region are symmetrical with respect to a radial direction of the rotary wheel, and a second waveband converting region of the second surface is opposite to and symmetrical to the first waveband converting region. Each of the first and the second waveband converting regions is used to convert the first or the second light beam into a third light beam of a third waveband. The third light beam of the third waveband is optically coupled to the multiband filter using the reflector. The multiband filter is used to allow the fourth light beam of a fourth waveband in the third light beam to pass therethrough and used to reflect the fifth light beam of a fifth waveband included in the third light beam. The fourth waveband and the fifth waveband are contained in the third waveband.

With the aforesaid arrangements, the light beams of different wavebands will be received by the light valve of a projector in different time periods. Thereby, a 3D image can be provided to the viewer.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention provides a light source system. It shall be appreciated that in the following embodiments and attached drawings, the description of these embodiments is only for the purpose of illustration rather than to limit the present invention. Meanwhile, in the following embodiments and attached drawings, elements not directly related to the present invention are omitted from depiction; and the dimensional relationships among the number of individual elements in the attached drawings are illustrated only for ease of understanding but not to limit the actual scale, the actual size and the actual number.

Figure 1A:
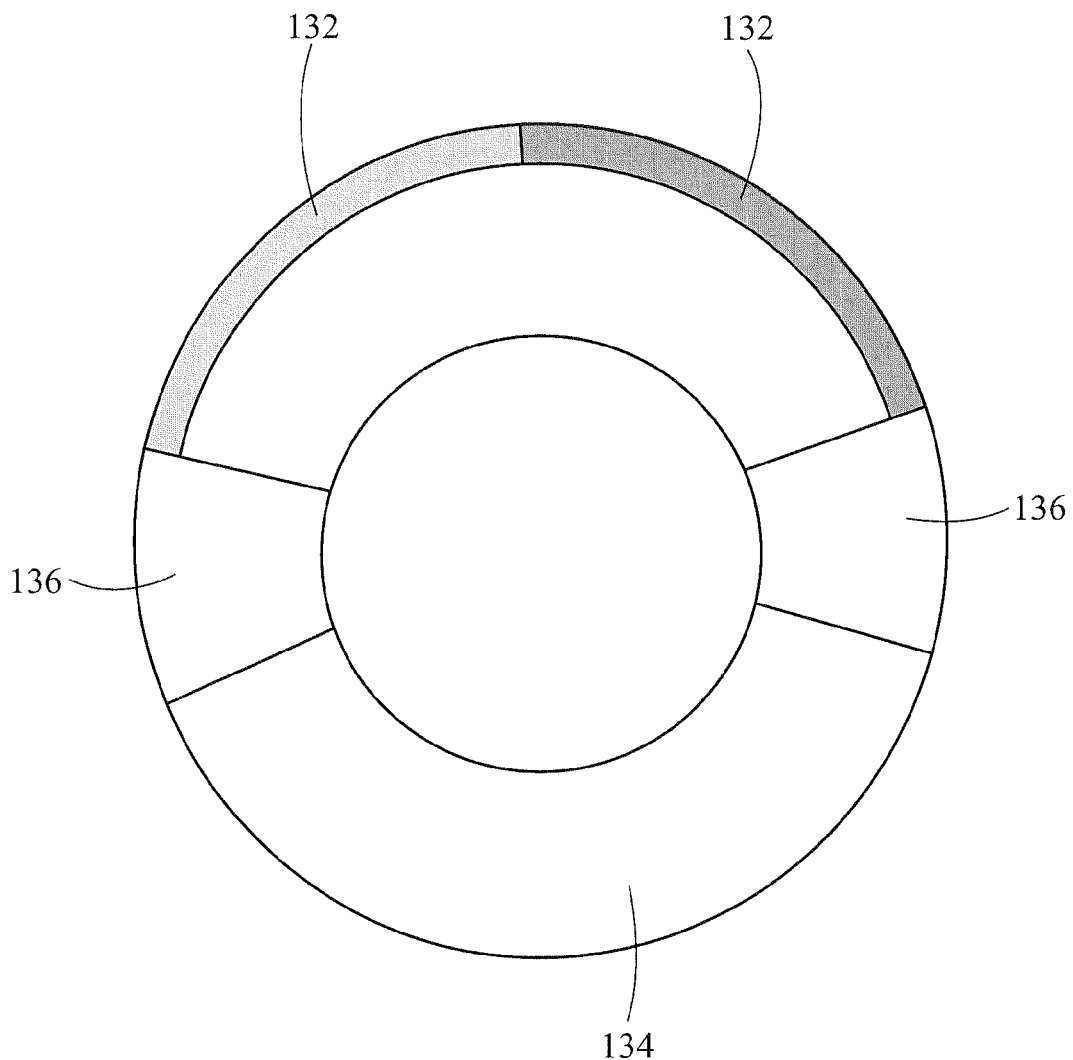
FIG. 1A is a front view illustrating a rotary wheel of a first embodiment of a light source system of the present invention.
Figure 1B:
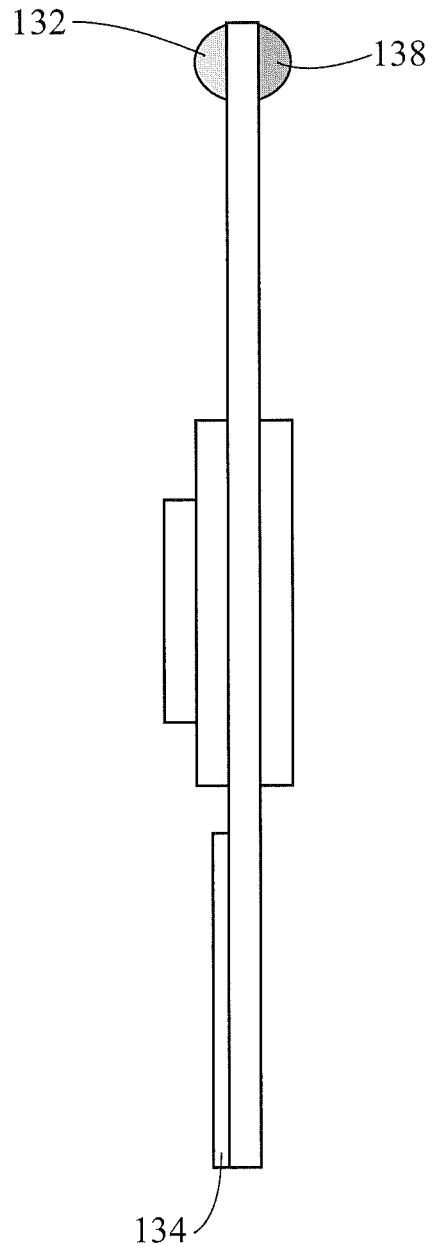
FIG. 1B is a side view of the rotary wheel shown in FIG. 1A.

First, FIGS. 1A and 1B show a front and side view of a rotary wheel of the first embodiment of a light source system of the present invention respectively. The rotary wheel 13 may be disposed in the light source system (please refer to FIG. 2A) of the present invention, and may be driven by an actuator (not shown). In detail, the actuator is connected to the rotary wheel 13, and can rotate the rotary wheel 13.

Furthermore, the rotary wheel 13 has a first surface and a second surface opposite to the first surface, and the first surface is illustrated in the front view of FIG. 1A. The first surface further has a first waveband converting region 132, a reflecting region 134 and a transmission region 136. The first waveband converting region 132 and the reflecting region 134 are disposed at two sides (e.g., an upper side and a lower side) of a rotary shaft of the rotary wheel 13 respectively and symmetrically with respect to the radial direction of the rotary wheel 13.

The first waveband converting region 132 further comprises a red light waveband converting region and a green light waveband converting region, while the transmission region 136 further comprises a first transmission region and a second transmission region which are symmetrical with respect to the radial direction of the rotary wheel 13. When the rotary wheel 13 is disposed in the light source system, the light beams generated by solid-state light sources of the light source system will be, corresponding to the first waveband converting region 132, the reflecting region 134 or the transmission region 136, converted into a light beam of another waveband (defined as the third light beam), which is converted by the first waveband converting region 132.

FIG. 1B illustrates that the second surface opposite to the first surface has a second waveband converting region 138, which is symmetrical and opposite to the first waveband converting region 132. The second waveband converting region 138 also comprises a red light waveband converting region and a green light waveband converting region (not shown), and can also convert the light beams generated by the solid-state light sources of the light source system into a light beam of another waveband (also defined as the third light beam). In other words, both the light beams converted by the first and the second waveband converting region 132,138 are defined as the third light beam.

Because the first waveband converting region 132 and the second waveband converting region 138 each comprise a green light waveband converting region and a red light waveband converting region, the light beam generated by any one of the first waveband converting region 132 and the second waveband converting region 138 comprises a green light and a red light. In other embodiments, if the first waveband converting region 132 and the second waveband converting region 138 each further comprise a yellow light waveband converting region, then the light beam generated through conversion may also comprise a yellow light.

Furthermore, the first waveband converting region 132 and the second waveband converting region 138 each are reflective waveband converting regions. That is, the first waveband converting region 132 and the second waveband converting region 138 each have a reflective surface and a phosphor material disposed on the reflective surface. The phosphor material is adapted to convert the waveband of the light beam, and the reflective surface is adapted to reflect the light beam generated through conversion. In other words, the light beam generated by the first waveband converting region 132 (or the second waveband converting region 138) through conversion will be reflected from the first waveband converting region 132 (or the second waveband converting region 138) by the reflective surface, but is not transmitted through the rotary wheel 13.

Figure 2A:
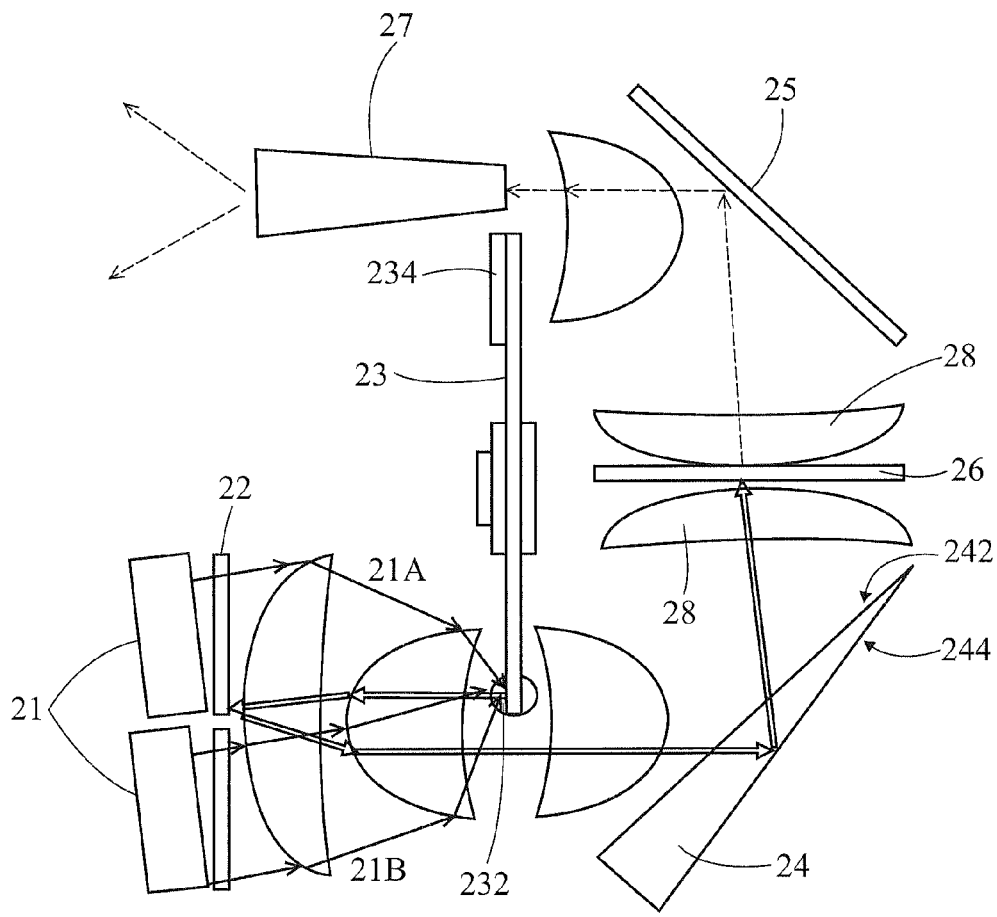
FIG. 2A is a schematic view illustrating the first embodiment of the light source system of the present invention at a first timing.
Figure 2B:
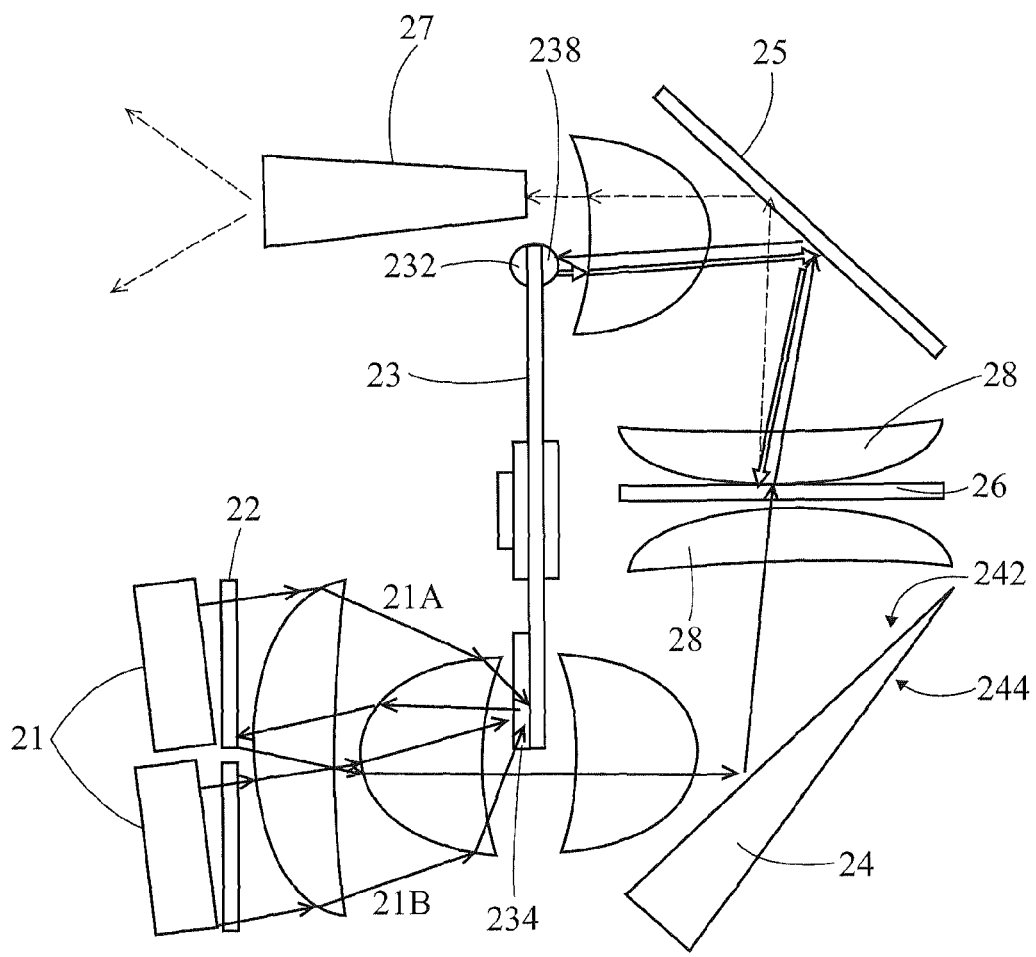
FIG. 2B is a schematic view illustrating the first embodiment of the light source system of the present invention at a third timing.
Figure 2C:
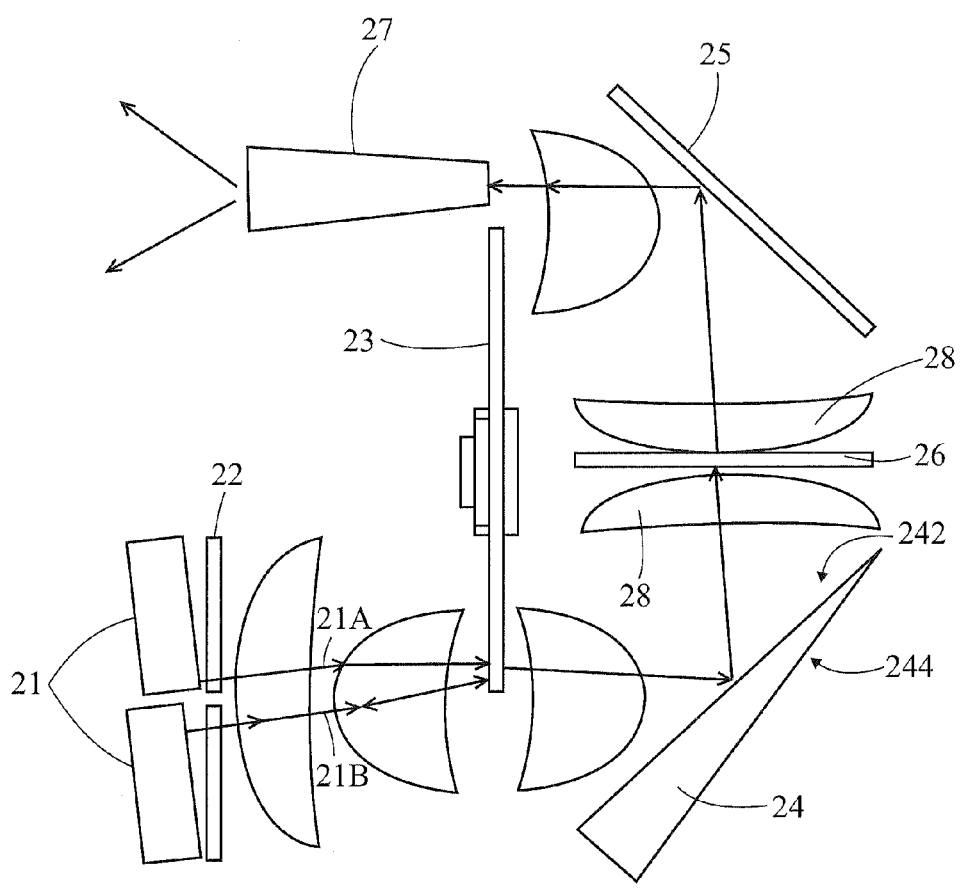
FIG. 2C is a schematic view illustrating the first embodiment of the light source system of the present invention at a second or a fourth timing.

FIGS. 2A to 2C illustrate schematic views of the first embodiment of the light source system at different timings respectively. In this embodiment, the light source system 2 may comprise two solid-state light sources 21, two filters 22, a rotary wheel 23, a first reflector 24, a second reflector 25, a multiband filter 26 and a light homogenizing element 27.

The rotary wheel 23 is similar to the rotary wheel 13 as shown in FIG. 1A and FIG. 1B. The two solid-state light sources 21 and the two filters 22 are disposed in front of the first surface of the rotary wheel 23 (i.e., the front side of the rotary wheel 23); and the first reflector 24, the second reflector 25 and the multiband filter 26 are disposed in front of the second surface of the rotary wheel 23 (i.e., the back side of the rotary wheel 23). To clearly show the relative positional relationships between the rotary wheel 23 and other members in the light source system 2, related members (e.g., a brake) for manipulating the rotary wheel 23 have been omitted herein.

The multiband filter 26 is disposed between the first reflector 24 and the second reflector 25. Furthermore, a multiband filter 26 is optically coupled with the first reflector 24 and the second reflector 25 respectively. The light homogenizing element 27 optically couples with the second reflector 25 for receiving a light beam from the second reflector 25. The light homogenizing element 27 may be a lens array, a fly lens, an integration rod or a light tunnel, but is not limited thereto.

It shall be appreciated that, "optically coupled" described in the context of the present invention generally refers to the propagation of light beams between optical elements; that is, if the two optical elements optically couple with each other, then it means that a light beam from one of the optical elements can be propagated to the other optical elements.

The two solid-state light sources 21 are disposed adjacent to each other, and respectively used to provide the first light beam 21A of a first waveband and the second light beam 21B of a second waveband. The two solid-state light sources may each be a laser light emitting device; while the first light beam 21A and the second light beam 21B are each a blue light (a blue laser light beam), but the first waveband of the first light beam 21A is different from the second waveband of the second light beam 21B. For example, the first waveband of the first light beam 21A may be about 460 nanometers (nm), while the second waveband of the second light beam 21B may be about 448 nm.

Depending on the different operational modes of the two solid-state light sources 21, the implementation of the transmission region (as shown in FIG. 1A) of the rotary wheel 23 will vary correspondingly.

In detail, with reference to FIG. 1A, if the two solid-state light sources 21 are turned on simultaneously and continuously, then the first transmission region of the rotary wheel 23 may be a filter and matches or corresponds to the first waveband of the first light beam 21A. In other words, when the first light beam 21A and the second light beam 21B are emitted to the first transmission region simultaneously, the first transmission region allows only the first light beam 21A of the first waveband to pass therethrough but reflects the second light beam 21B of the second waveband. Similarly, a second transmission region of the rotary wheel 23 may also be a filter and match with the second waveband.

If the two solid-state light sources are turned on at different times (non-simultaneously), then the first transmission region and the second transmission region of the rotary wheel 23 may be transparent plates without selectively filtering the first waveband and the second waveband. Thus, when being emitted to the first transmission region or the second transmission region, the first light beam 21A or the second light beam 21B can pass through the first transmission region or the second transmission region directly.

With reference to FIGS. 2A to 2C again, the two filters 22 are disposed in front of the two solid-state light sources 21 respectively, and matches or corresponds to the first waveband of the first light beam 21A and the second waveband of the second light beam 21B respectively. The filter 22 that matches the first waveband allows only the first light beam 21A of the first waveband to pass therethrough but reflects the light beams of other wavebands. Similarly, the filter 22 that matches the second waveband allows only the second light beam 21B of the second waveband to pass therethrough but reflects the light beams of other wavebands.

Figure 3:
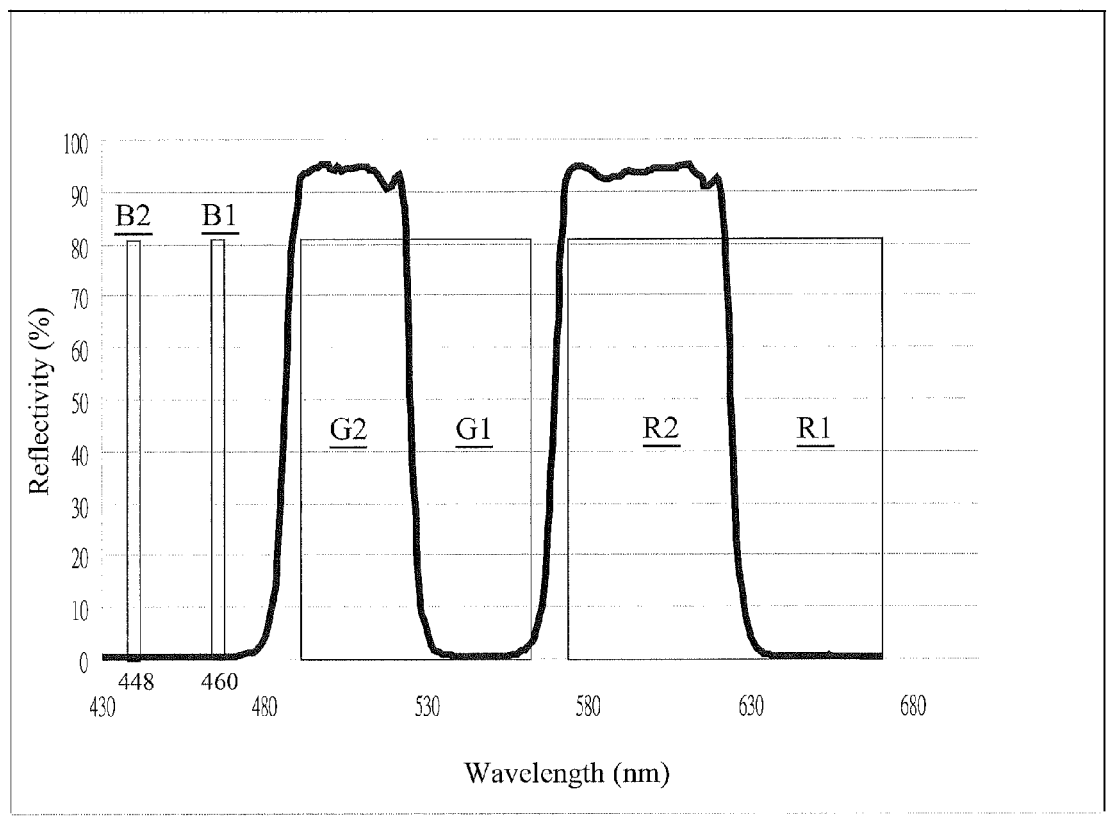
FIG. 3 is a schematic view illustrating the wavebands versus transmissivity of a multiband filter in the first embodiment of the light source system of the present invention.

The multiband filter 26 may be a transparent plate on which a plurality of optical coatings are disposed to allow the light beams of a plurality of specific wavebands to pass therethrough and reflect the light beams of a plurality of other specific wavebands. Hereinbelow, the light beams that can pass through the multiband filter 26 are defined as the fourth light beam, while the light beams reflected by the multiband filter 26 are defined as the fifth light beam. With reference to FIG. 3, in this embodiment, the multiband filter 26 can allow the blue light beams of a waveband B1 (the first waveband) and a waveband B2 (the second waveband), green light beams of a waveband G2 and red light beams of a waveband R2 to pass therethrough, but reflect green light beams of a waveband G1 and red light beams of a waveband R1.

In this embodiment, the first reflector 24 may be a wedge-shaped reflector, which may be made of a light transmissive material. The first reflector 24 comprises a filtering surface 242 and a reflective surface 244, which are two surfaces of the wedge-shaped reflector that are oblique to each other (i.e., the reflective surface 244 is oblique to the filtering surface 242). The filtering surface 242 and the reflective surface 244 are coated with an optical coating for filtering and an optical coating for reflecting respectively. The filtering surface 242 is adapted to allow the third light beam, which is generated by the first waveband converting region 232 of the rotary wheel 23 to pass therethrough and the filtering surface 242 reflects the first light beam 21A and the second light beam 21B. The reflective surface 244 is adapted to reflect the third light beam. In other embodiments, the first reflector 24 may be comprised of two transparent plates (not shown); one of the two transparent plates has a filtering surface, while the other of the two plates has a reflective surface which is oblique to the filtering surface. Similarly, the filtering surface is used to allow the third light beam to pass therethrough and reflect the first or the second light beam.

The second reflector 25 also has a reflective surface, which is adapted to reflect the first light beam 21A, the second light beam 21B, the fourth light beam or the fifth light beam. In some conditions, the light source system 2 could comprise two lenses 28, which are disposed at two sides (a top side and a bottom side) of the multiband filter 26 and between the first reflector 24 and the second reflector 25.

Thereinafter, the operation of the light source system 2 will be described. For ease of understanding and description, the operating process of the light source system 2 is divided into a first timing, a second timing, a third timing and a fourth timing according to the first waveband converting region, the reflecting region, the first transmission region and the second transmission region of the rotary wheel 23 respectively. This division of the operating process is made only for the convenience of description but not for purpose of limitation; and in the practical operation of the light source system 2, the timings may be rearranged according to preference.

Furthermore, due to the clarity and ease of understanding, the light beams of different wavebands in FIGS. 2A to 2C are depicted by using different lines. Moreover, at each of the timings, the two solid-state light sources 21 are turned on simultaneously and continuously.

With reference to FIG. 2A, at the first timing, the first waveband converting region 232 of the rotary wheel 23 rotates to a position corresponding to the two solid-state light sources 21. The first light beam 21A and second light beam 21B are converged onto the first waveband converting region 232 of the rotary wheel 23 by a lens unit disposed between the two solid-state light sources 21 and the rotary wheel 23.

After being converged onto the first waveband converting region 232, the first light beam 21A and the second light beam 21B are converted by the first waveband converting region 232 into the third light beam of a third waveband (depicted by thick hollow arrows). In this case, the third light beam is the red light or the green light. The third light beam of the third waveband does not match with the two filters 22, so it is reflected by the filters 22 and then propagates to the first reflector 24 (does not pass through the rotary wheel 23).

Then, the third light beam passes through the filtering surface 242 of the first reflector 24, is reflected by the reflective surface 244 and collimated by the lenses 28, and then to the multiband filter 26. The multiband filter 26 allows a fourth light beam (depicted by dashed arrows) of a fourth waveband included in the third light beam to pass therethrough, and the light beams (not shown) of other wavebands included in the third light beam are reflected by the multiband filter 26. In brief, the other waveband included in the third light beam cannot pass through the multiband filter 26.

The fourth waveband described above is the waveband G2 or R2 shown in FIG. 3, so the fourth light beam is still a green light or a red light with a narrower waveband. The fourth waveband is contained in the third waveband of the third light beam. For example, if the third waveband of the third light beam contains the waveband G2 and the waveband G1, then the fourth waveband of the fourth light beam is a part of the third waveband (i.e., the waveband G2).

Thereafter, after being collimated by the lenses 28, the fourth light beam is delivered to the second reflector 25. The fourth light beam is reflected by the second reflector 25 into the light homogenizing element 27 so that the fourth light beam is homogenized before entering into a light valve (e.g., a DMD, an LCD or an LCOS that are not shown in the figures) of a projector. Finally, the fourth light beam can be projected outwards by the projector as color components (i.e., a red component and a green component) of a first view angle image (e.g., a left-eye view angle image).

With reference to FIG. 2C, at the second timing, the second transmission region (as shown in FIG. 1A) of the transmission region of the rotary wheel 23 rotates to the position corresponding to the two solid-state light sources 21, and the first light beam 21A and the second light beam 21B are converged onto the second transmission region of the rotary wheel 23. Because the second transmission region is the filter "matching with the second waveband", only the second light beam 21B can pass through the second transmission region while the first light beam 21A is reflected by the second transmission region.

Then, the second light beam 21B passing through the second transmission region is reflected by the filtering surface 242 of the first reflector 24, then passes through the multiband filter 26. The multiband filter 26 does not affect (e.g., convert or reflect) the second light beam 21B (as shown in FIG. 3), so the second light beam 21B remains unchanged after passing through the multiband filter 26. Next, the second light beam 21B is reflected by the second reflector 25 into the light homogenizing element 27, and then reaches the light valve of the projector. Finally, the second light beam 21B can be projected outwards by the projector as the other color component (i.e., a blue component) of the first view angle image (the left-eye view angle image).

As can be known from the above descriptions, at the first timing and the second timing, the light source system 2 can respectively output the light beams of two different wavebands (R2 or G2, B2) to the light valve of the projector. With these arrangements, the projector can project the complete first view angle image with RGB color.

Next, FIG. 2B depicts the light source system 2 in the third timing. The reflecting region 234 of the rotary wheel 23 rotates to the position corresponding to the two solid-state light sources 21, while the first light beam 21A and the second light beam 21B are emitted onto the reflecting region 234 of the rotary wheel 23. The first light beam 21A is reflected by the reflecting region 234 and is transmitted to the filter 22 matching with the second waveband (the lower filter of the two filters 22). The first light beam 21A is then reflected by the filter 22 and propagates to the first reflector 24 (does not pass through the rotary wheel 23). On the other hand, the second light beam 21B is reflected by the reflecting region 234 and is then reflected to the first reflector 24 by the filter 22 that matches the first waveband (the upper filter 22).

Then, the first light beam 21A and the second light beam 21B are reflected by the filtering surface 242 of the first reflector 24 and then to the multiband filter 26. The multiband filter 26 does not affect (e.g., convert or reflect) the first light beam 21A and the second light beam 21B. Thereafter, the first light beam 21A and the second light beam 21B are reflected by the second reflector 25 and propagates to the second waveband converting region 238 on the second surface of the rotary wheel 23. The first light beam 21A and the second light beam 21B are then converted by the second waveband converting region 238 into the third light beam (depicted by thick hollow arrows) of the third waveband. In this case, the third light beam is a red light or a green light.

Then, the third light beam is reflected to the multiband filter 26 by the second reflector 25. After the third light beam reaches the multiband filter 26, the multiband filter 26 allows the fourth light beam (not shown) of the fourth waveband included in the third light beam to pass therethrough and reflects the fifth light beam (depicted by dashed arrows) of a fifth waveband included in the third light beam. The fifth waveband may be the waveband G1 or R1 shown in FIG. 3, so the fifth light beam is still a green light or a red light.

The fifth waveband is also contained in the third waveband of the third light beam. For example, if the third waveband of the third light beam contains the waveband G1 and the waveband G2, then the fifth waveband of the fifth light beam is a part of the third waveband (i.e., the waveband G1).

The fifth light beam that is reflected by the multiband filter 26 propagates to the second reflector 25 and is reflected by the second reflector 25 into the light homogenizing element 27. Then, the fifth light beam enters the light valve of the projector. Finally, the fifth light beam can be partially projected outwards by the projector as a color component (i.e., a red component and a green component) of a second view angle image (e.g., a right-eye view angle image).

With reference to FIG. 2C, at the fourth timing, the first transmission region (as shown in FIG. 1A) of the transmission region of the rotary wheel 23 rotates to the position corresponding to the two solid-state light sources 21, and the first light beam 21A and the second light beam 21B are converged onto the first transmission region of the rotary wheel 23. Because the first transmission region is the filter that "matches the first waveband", only the first light beam 21A can pass through the first transmission region while the second light beam 21B is reflected by the first transmission region.

Then, the first light beam 21A that passes through the first transmission region is reflected by the filtering surface 242 of the first reflector 24 and is transmitted to the multiband filter 26. The multiband filter 26 does not affect the first light beam 21A. Next, the first light beam 21A is reflected by the second reflector 25, enters the light homogenizing element 27 and reaches the light valve of the projector. Finally, the first light beam 21A can be projected outwards by the projector as the other color component (i.e., a blue portion) of the second view angle image (the right-eye view angle image).

As can be known from the above descriptions, at the third timing and the fourth timing, the light source system 2 at least can output the light beams of another three wavebands (R1, G1, and B1) to the light valve of the projector so that the projector can project the complete second view angle image.

It shall be appreciated that at the second timing and the fourth timing, the two solid-state light sources 21 may also be turned on at different times. In detail, at the second timing, only the lower solid-state light source 21 is turned on so that only the second light beam 21B is converged to the second transmission region. At the fourth timing, only the upper solid-state light source 21 is turned on so that only the first light beam 21A is converged to the first transmission region. Because only the first light beam 21A is converged to the first transmission region, it is unnecessary for the first transmission region to reflect the second light beam; and likewise, it is unnecessary for the second transmission region to reflect the first light beam. Thus, the first transmission region and the second transmission region may each be a transparent plate.

Figure 4:
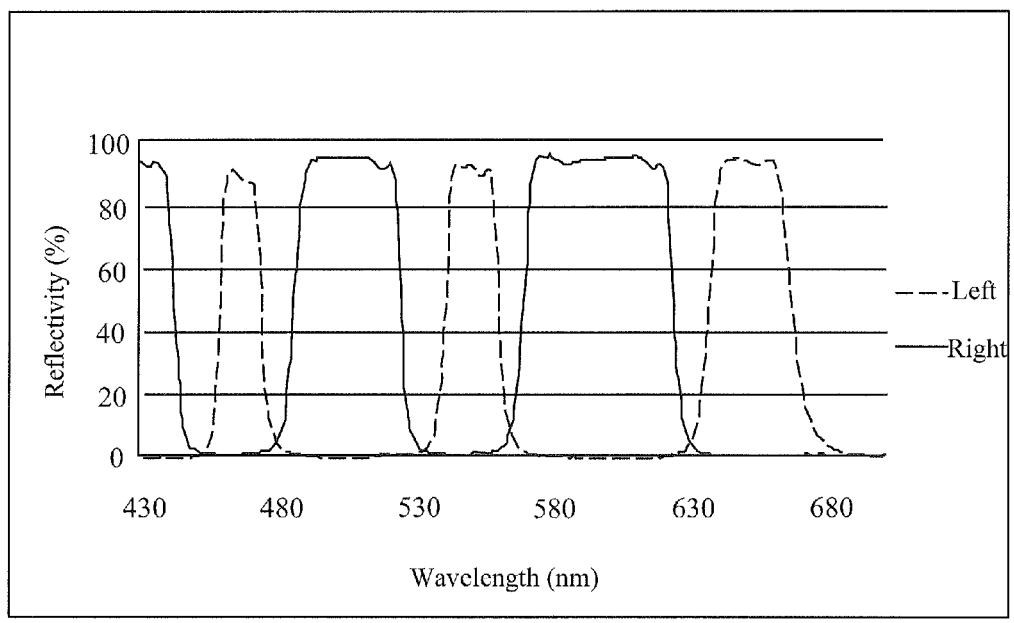
FIG. 4 is a schematic view illustrating the wavebands versus transmissivity of a pair of passive glasses used with the first embodiment of the light source system of the present invention.

With reference to FIG. 4 in combination with FIG. 2A and FIG. 3, FIG. 4 is a schematic view illustrating wavebands versus transmissivity of a pair of passive glasses used with the first embodiment of the light source system of the present invention. While receiving the first view angle image and the second view angle image projected by the projector, a viewer must wear a pair of passive glasses (not shown). The left lens of the passive glasses only allows the light beams of the waveband R1, the waveband G1 and the waveband B1 to pass therethrough, while the right lens of the passive glasses only allows the light beams of the waveband R2, the waveband G2 and the waveband B2 to pass therethrough.

For the viewer wearing the pair of passive glasses, his or her left eye only accepts "the first view angle image formed by the light beams of the waveband R1, the waveband G1 and the waveband B1" and his or her right eye only accepts "the second view angle image formed by the light beams of the waveband R2, the waveband G2 and the waveband B2"; and then a 3D image is formed in the viewer's brain.

It shall be appreciated that apart from being used in the projection of a 3D image, the light source system 2 may also be used in projection of a 2D image.

In detail, if it is desired to switch a projection system capable of displaying both a 3D image and a 2D image to display the 2D image when the light source system of the present invention is applied to the projection system, then the rotary wheel 23 of the light source system 2 is kept still without rotation and the transmission region of the rotary wheel 23 is disposed corresponding to the solid-state light sources 21 so that the first light beam 21A or the second light beam 21B is continuously converged to the transmission region. Thus, the light homogenizing element 27 of the light source system 2 only outputs the first light beam 21A or the second light beam 21B (i.e., the blue laser light beam). Then, a color wheel (not shown) is disposed in front of the light exit surface of the light homogenizing element 27; and after passing through the color wheel, the first light beam 21A or the second light beam 21B can be converted into a light beam of some other waveband for use in the projection of the 2D image.

According to the above descriptions, by using two solid-state light sources and a rotary wheel with a multiband filter, the light source system of the present invention can output light beams of different wavebands to a light valve of a projector at different timings so that the projector can project images of different view angles to the viewer. Furthermore, the light source system of the present invention can also be used in the projection of a 2D image to impart a desirable color gamut to the 2D image. In summary, the light source system of the present invention at least has one of the following features: a low manufacturing cost, a simplified optical structure, a miniaturized volume, and improved brightness of outputted light beams.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system, comprising:
    two solid-state light sources, being disposed adjacent to each other, and respectively used to provide a first light beam of a first waveband and a second light beam of a second waveband;
    two filters, being disposed in front of the two solid-state light sources respectively, and respectively matching with the first waveband and the second waveband;
    a rotary wheel, having a first surface and a second surface opposite to the first surface, wherein the two solid-state light sources and the two filters are disposed in front of the first surface of the rotary wheel, the first surface comprises a first waveband converting region, a reflecting region and a transmission region, and the second surface comprises a second waveband converting region, the first waveband converting region and the reflecting region are symmetrical with respect to a radial direction of the rotary wheel, the second waveband converting region of the second surface is symmetrical to the first waveband converting region, and each of the first and the second waveband converting regions is used to convert the first or the second light beam into a third light beam of a third waveband;
    a first reflector and a second reflector, being disposed in front of the second surface of the rotary wheel; and
    a multiband filter, being disposed in front of the second surface of the rotary wheel and being disposed between the first and the second reflectors, wherein the multiband filter optically couples with the first and the second reflectors, the multiband filter is used to allow a fourth light beam of a fourth waveband included in the third light beam to pass therethrough and used to reflect a fifth light beam of a fifth waveband included in the third light beam, and the fourth waveband and the fifth waveband are contained in the third waveband.

2. The light source system as claimed in claim 1, wherein the first reflector comprises two plates, one of the two plates has a filtering surface and the other of the two plates has a reflective surface which is oblique to the filtering surface, and the filtering surface is used to allow the third light beam to pass therethrough and reflect the first or the second light beam.

3. The light source system as claimed in claim 1, wherein the first reflector is formed in a wedged shape, and the first reflector comprises a filtering surface and a reflective surface which is oblique to the filtering surface, and the filtering surface is used to allow the third light beam to pass therethrough and reflect the first or the second light beam.

4. The light source system as claimed in claim 1, further comprising a lens unit, being disposed between the two solid-state light sources and the rotary wheel, and being used to focus the first or the second light beam onto the first surface of the rotary wheel.

5. The light source system as claimed in claim 2, further comprising a lens unit, being disposed between the two solid-state light sources and the rotary wheel, and being used to focus the first or the second light beam onto the first surface of the rotary wheel.

6. The light source system as claimed in claim 3, further comprising a lens unit, being disposed between the two solid-state light sources and the rotary wheel, and being used to focus the first or the second light beam onto the first surface of the rotary wheel.

7. The light source system as claimed in claim 4, further comprising two lenses, being disposed at two sides of the multiband filter and between the first and the second reflectors.

8. The light source system as claimed in claim 1, wherein the transmission region of the rotary wheel comprises a first transmission region and a second transmission region.

9. The light source system as claimed in claim 2, wherein the transmission region of the rotary wheel comprises a first transmission region and a second transmission region.

10. The light source system as claimed in claim 3, wherein the transmission region of the rotary wheel comprises a first transmission region and a second transmission region.

11. The light source system as claimed in claim 8, wherein the first transmission region matches with the first waveband, and the second transmission region matches with the second waveband.

12. The light source system as claimed in claim 1, further comprising a light homogenizing element, which optically couples with the second reflector.

13. The light source system as claimed in claim 2, further comprising a light homogenizing element, which optically couples with the second reflector.

14. The light source system as claimed in claim 3, further comprising a light homogenizing element, which optically couples with the second reflector.

15. The light source system as claimed in claim 12, wherein the light homogenizing element is a lens array, a fly lens, an integration rod or a light tunnel.

16. The light source system as claimed in claim 1, wherein the two solid-state light sources are laser light emitting devices.

17. The light source system as claimed in claim 2, wherein the two solid-state light sources are laser light emitting devices.

18. The light source system as claimed in claim 3, wherein the two solid-state light sources are laser light emitting devices.

19. The light source system as claimed in claim 16, wherein the first and the second light beams are blue lights, and the third light beam is a red light, a green light or a yellow light.

* * * * *